United States Patent
Cho et al.

(10) Patent No.: US 6,631,459 B1
(45) Date of Patent: Oct. 7, 2003

(54) EXTENDED INSTRUCTION WORD FOLDING APPARATUS

(75) Inventors: Kyung Youn Cho, Pusan (KR); Jong Yoon Lim, Seoul (KR); Geun Taek Lee, Seoul (KR); Hyeong Cheol Oh, Seoul (KR); Hyun Gyu Kim, Hanam-Si (KR); Byung Gueon Min, Kyungki-Do (KR); Heui Lee, Kyungki-Do (KR)

(73) Assignee: Asia Design Co., Ltd. (KR)

( * ) Notice: Subject to any disclaimer, the term of this patent is extended or adjusted under 35 U.S.C. 154(b) by 578 days.

(21) Appl. No.: 09/644,642

(22) Filed: Aug. 24, 2000

(30) Foreign Application Priority Data

Jun. 30, 2000 (KR) .................................... 2000-0036719

(51) Int. Cl.[7] .............................. G06F 9/28; G06F 9/318
(52) U.S. Cl. ...................... 712/210; 712/213; 712/300; 712/207; 712/227; 710/307; 711/172
(58) Field of Search ............................. 712/23, 24, 41, 712/42, 43, 207, 210, 213, 300, 227; 710/307; 711/172

(56) References Cited

U.S. PATENT DOCUMENTS 6,282,633 B1 * 8/2001 Killian et al. ............... 712/210
6,449,712 B1 * 9/2002 Irie et al. .................... 712/227

* cited by examiner

Primary Examiner—Daniel H. Pan
(74) Attorney, Agent, or Firm—Cantor Colburn LLP

(57) ABSTRACT

An apparatus includes an instruction word storage for storing a plurality of general instruction words and extended instruction words, a temporary storage unit including a plurality of buffers for pre-fetching and storing the plurality of instruction words from the instruction word storage, an instruction word search unit for receiving and decoding the plurality of instruction words pre-fetched and outputting a position signal of a general instruction word and the positions of one or more successive extended instruction words stored in the temporary storage a selector for selecting a buffer in which a general instruction word is stored and outputting the general instruction word sequentially, according to the position signal a general instruction word parser for receiving a general instruction word from the selector and outputting a plurality of control signals for executing the general instruction word simultaneously, an extended data parser is provided for performing an operational processing of operands of one or more successive extended instruction words stored in each buffer of the temporary storage according to the position signal.

10 Claims, 4 Drawing Sheets

EXTENDED INSTRUCTION WORD FOLDING APPARATUS

BACKGROUND OF THE INVENTION

1. Field of the Invention

The present invention relates to an extended instruction word folding apparatus. More particularly, present invention relates to an extended instruction word folding apparatus for processing extended instruction words when a microprocessor using a fixed length instruction perform a general instruction word.

2. Background Information

In general, a microprocessor reads a program comprised of a set of a plurality of instruction words stored in a memory, interpreters the read program by an instruction interpreter, and executes an operation corresponding to each instruction by an execution unit.

An instruction word is called a variable length instruction word according to the length of the instruction word, that is, if a magnitude of the number of bits in an instruction word is diverse. Meanwhile, if the magnitude of the number of bits in all instruction words is same, the instruction word is called a fixed length instruction word.

A conventional microprocessor is divided into a CISC (Complex Instruction Set Computer) and a RISC (Reduced Instruction Set Computer), in which the CISC uses a variable length instruction word and the RISC uses a fixed length instruction word.

A variable length instruction word system has a diverse length according to the instruction word and many a kind of instruction words. However, since the length of the instruction word is variable, an instruction interpreter interpreting the instruction word has a complex configuration and a low execution speed.

Meanwhile, a fixed length instruction word system uses fixed length instruction words all of which the lengths are constant, in which a configuration of an instruction word interpreter is simple and a high speed operation is possible, but the length of the instruction word is fixed to thereby restrict the range of an operand to be represented. That is, since the length of the operand is smaller than the magnitude of a register or the magnitude of the address range of a storage device, a constant value larger than the magnitude of an instruction word or the address of the storage device cannot be made up with a single instruction word.

An extended instruction word method is to solve the above problems of the conventional variable length instruction word system and the conventional fixed length instruction word system. The extended instruction word system is equipped with an extended data storage device while adopting fixed length instruction words where the lengths of all instruction words are constant, to thereby represent instruction words of all lengths.

FIG. 1 is an operational diagram for an extended instruction word system.

As shown in FIG. 1, two extended instruction words are used in order to represent a constant value larger than the magnitude of an instruction word, or the address of a storage device. In FIG. 1, an operational code OP of an instruction word read from the storage device is interpreted. Here, if the operational code OP is a general instruction word, the instruction word is executed by an execution unit according to a corresponding operational code. Meanwhile, the operational code OP of the read instruction word is an extended instruction word, a first operand OPER1 of the instruction word is stored in an extended data storage unit ER. In this case, if the extended instruction word is an extended instruction word which is firstly used following a general instruction word using extended data stored in the extended data storage unit ER, the higher upper bits than the first operand OPER1 of the extended instruction word in the extended data storage unit ER are filled with the most significant bit (MSB) of the first operand OPER1 in the extended instruction word, and then the position of the same bit as the first operand OPER1 of the extended instruction word is filled with the first operand OPER1 in the extended instruction word.

If the following instruction word is an extended instruction word, extended data produced by operating and processing the first operand OPER1 stored in the extended data storage unit ER is shifted to the upper bit as many as the number of bits of a second operand OPER2, and the second operand OPER2 is placed on the lower bit which is empty in the extended data storage unit ER. Thus, the extended data storage unit ER places the second operand OPER2 and the first operand OPER1 from the least significant bit to the upper bit. That is, a value obtained by combining the first operand OPER1 with the second operand OPER2 is stored by two extended instruction words in the extended data storage unit ER.

Thus, through the above-described method, the fixed length instruction word system uses an extended instruction word, to thereby produce a constant value larger than the magnitude of the instruction word, or the address of a storage unit.

Since the fixed length instruction word system using the conventional extended instruction word reads an extended instruction word from the storage unit in the same manner as that of a general instruction word, parses the extended instruction word by the command interpreter, and executes the operation of the extended instruction word by an execution unit, the efficiency of both the CPU and the program is lowered.

In view of the above, there exists a need for an extended instruction word folding apparatus which overcomes the above mentioned problems in the prior art. This invention addresses this need in the prior art as well as other needs, which will become apparent to those skilled in the art from this disclosure.

SUMMARY OF THE INVENTION

To solve the above problems, it is an object of the present invention to provide an extended instruction word folding apparatus for maximizing the efficiency of both a CPU and a program, in which a following extended instruction word is processed during the time of reading and executing a general instruction word in order to use a constant value larger than the magnitude of the general instruction word, or the address of a storage unit, to thereby immediately process a general instruction word subsequent to the following extended instruction word.

To accomplish the above object of the present invention, there is provided an extended instruction word folding apparatus comprises: an instruction word storage unit for storing instruction words including a plurality of general instruction words and extended instruction words; a temporary storage unit including a plurality of buffers for pre-fetching the plurality of instruction words from the instruction word storage unit and storing the pre-fetched instruction words therein; an instruction word search unit for receiving the plurality of instruction words pre-fetched from the instruction word storage unit to the temporary storage unit, decoding the received instruction words, and outputting a position signal representing the position of a general instruction word and the positions of one or more successive extended instruction words, among the instruction words stored in the temporary storage unit; an instruction word selector for selecting a buffer in which a general instruction word is stored among the instruction words stored in each buffer of the temporary storage unit, and outputting the general instruction word sequentially, according to the position signal output from the instruction word search unit; a general instruction word parser for receiving a general instruction word output from the instruction word selector and outputting a plurality of control signals for executing the general instruction word; an extended data parser for performing an operational processing of operands of one or more successive extended instruction words among the instruction words stored in each buffer of the temporary storage unit, according to the position signal output from the instruction word search unit, and outputting extended data; and an extended data storage unit for storing the extended data received from the extended data parser.

Preferably, the instruction word search unit comprises: an extended instruction word search unit for receiving the instruction words pre-fetched from the instruction word storage unit to the temporary storage unit, judging whether each instruction word pre-fetched to the temporary storage unit is a general instruction word or an extended instruction word, and outputting an activated flag signal if the instruction word is determined an extended instruction word; a flag register including a plurality of flag bits indicating whether each instruction word stored in the plurality of buffers of the temporary storage unit is an extended instruction word or a general instruction word according to the flag signal output from the extended instruction word search unit; and an extended decoder for receiving the plurality of flag bits from the flag registers, determining an activation status of each flag bit, and outputting a position signal representing the positions of the buffer in which the general instruction word is stored and the buffer in which one or more successive extended instruction words are stored among the plurality of buffers in the temporary storage unit.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

The above object and other advantages of the present invention will become more apparent by describing the preferred embodiment thereof in more detail with reference to the accompanying drawing in which.

DETAILED DESCRIPTION OF THE PREFERRED EMBODIMENTS

A preferred embodiment of the present invention will be described with reference to the accompanying drawing.

Figure 1:
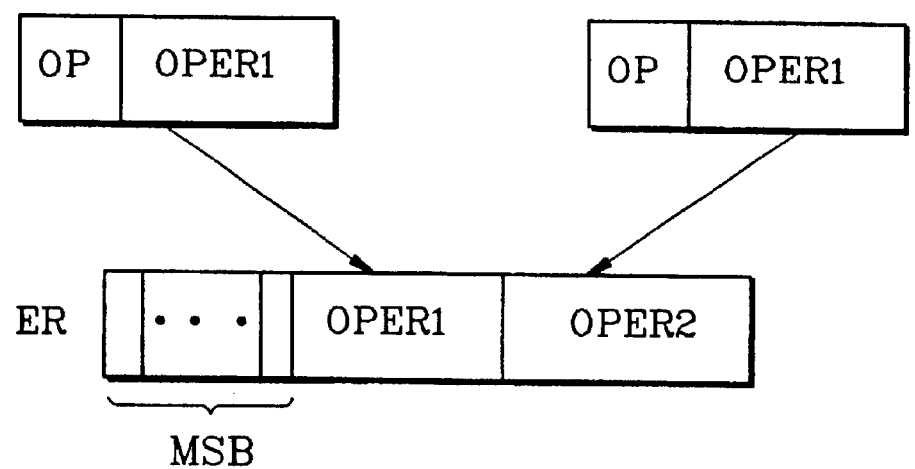
FIG. 1 shows a diagram showing the operation of an extended instruction word.
Figure 2:
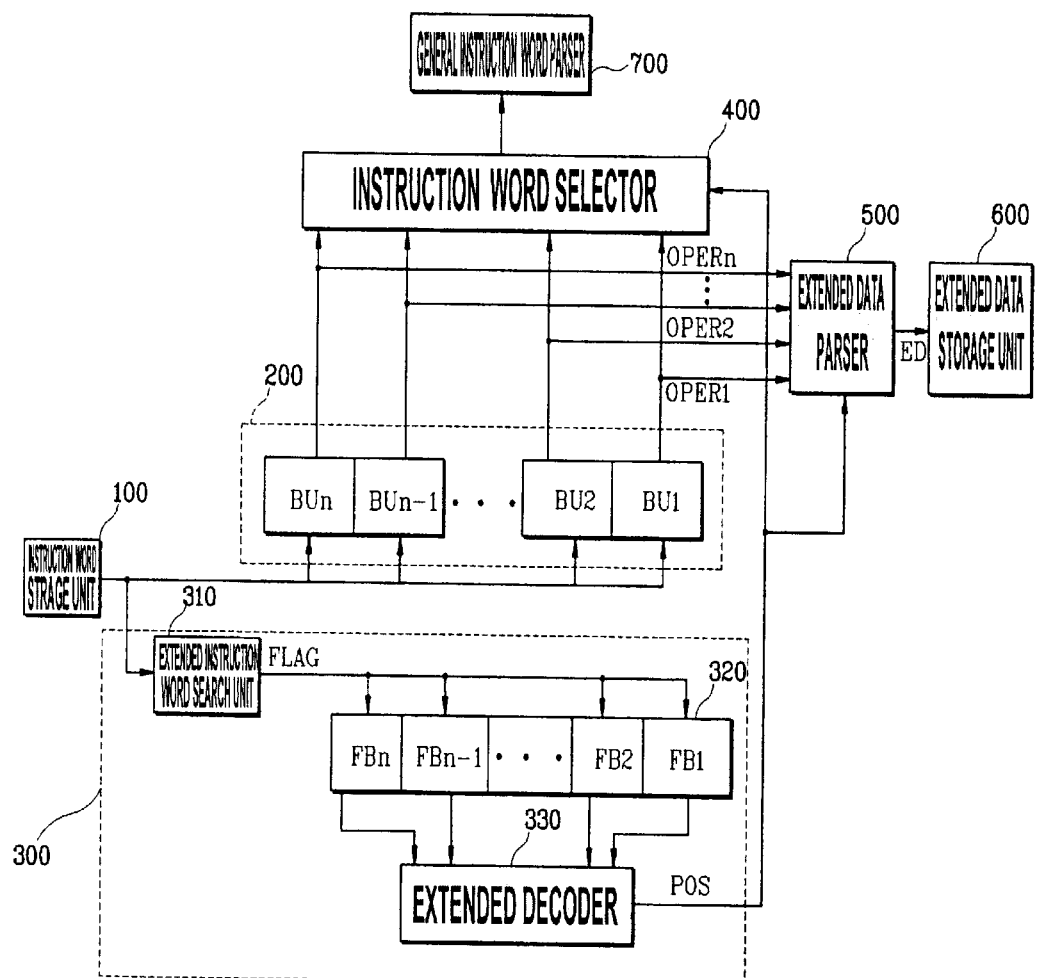
FIG. 2 is a block diagram showing an extended instruction word folding apparatus according to the present invention.

In FIG. 2 showing an extended instruction word folding apparatus according to the present invention, an instruction word storage unit 100 stores instruction words including a plurality of general instruction words and extended instruction words. A temporary storage unit 200 includes a plurality of buffers BU1–BUn for pre-fetching the plurality of instruction words from the instruction word storage unit 100 and storing the pre-fetched instruction words therein. An instruction word search unit 300 receives the plurality of instruction words pre-fetched from the instruction word storage unit 100 to the temporary storage unit 200, decodes the received instruction words, and outputs a position signal (POS) representing the position of a general instruction word and the positions of one or more successive extended instruction words, among the instruction words stored in the temporary storage unit 200. An instruction word selector 400 selects a buffer in which a corresponding general instruction word is stored in the case that the general instruction word exists among the instruction words stored in each buffer of the temporary storage unit, and outputs the general instruction word sequentially, according to the position signal (POS) output from the instruction word search unit 300. A general instruction word parser 700 receives a general instruction word output from the instruction word selector 400 and outputs a plurality of control signals for executing the general instruction word. An extended data parser 500 performs an operational processing of operands OPER–OPERn of one or more successive extended instruction words among the instruction words stored in each buffer BU1–BUn of the temporary storage unit 200, according to the position signal (POS) output from the instruction word search unit 300, and outputs extended data (ED). An extended data storage unit 600 stores the extended data (ED) received from the extended data parser 500.

The instruction word search unit 300 includes an extended instruction word search unit 310 for receiving the instruction words pre-fetched from the instruction word storage unit 100 to the temporary storage unit 200, judging whether each instruction word pre-fetched to the temporary storage unit 200 is a general instruction word or an extended instruction word, and outputting an activated flag signal (FLAG) if the instruction word is determined an extended instruction word, a flag register 320 including a plurality of flag bits FB1–FBn indicating whether each instruction word stored in the plurality of buffers BU1–BUn of the temporary storage unit 200 is an extended instruction word or a general instruction word according to the flag signal (FLAG) output from the extended instruction word search unit 310, and an extended decoder 330 for receiving the plurality of flag bits FB1–FBn from the flag registers 320, determining an activation status of each flag bit, and outputting a position signal (POS) representing the positions of the buffer in which the general instruction word is stored and the buffer in which one or more successive extended instruction words are stored, among the plurality of buffers BU1–BUn.

If all instruction words stored in the plurality of buffers BU1–BUn are processed by the instruction word selector 400 and the extended data parser 500, the temporary storage unit 200 pre-fetches new instruction words at the same time and updates the instruction word storage unit 100.

The extended data parser 500 performs an operational processing of operands OPER!–OPERn of the one or more successive extended instruction words in order to obtain extended data (ED) for executing an extended instruction word.

The extended data parser 500 investigates one or more successive extended instruction words stored in the plurality of buffers BU1-BUn of the temporary storage unit 200 in sequence of positions BU1, BU2, ..., BUn. As a result, the extended data parser 500 fills the lower bits of the extended data (ED) with the operands of the extended instruction word and fills the extended data (ED) of the upper bits higher than the number of bits of the operand of the extended instruction word with the same value as that of the most significant bit of the extended instruction word operand, if the extended instruction word is the first extended instruction word following the general instruction word using the extended data (ED) and is not successive with the previous extended instruction words. If the extended instruction word is an extended instruction word successive with the previous extended instruction word, the previously produced extended data (ED) is shifted to the upper place by the number of the bits of the operand of the extended instruction word and fills the empty lower bits with the operand of the extended instruction word.

If a general instruction word using the extended data (ED) produced by the one or more successive extended instruction words exists in the buffer of the temporary storage unit 200, the extended data (ED) produced by the one or more successive extended instruction words is output to the extended data storage unit 600 when a corresponding instruction word is output to the general instruction word parser 700 by the instruction word selector 400. If a general instruction word using the extended data (ED) produced by the one or more successive extended instruction words does not exist in the buffer of the temporary storage unit 200, the extended data (ED) produced by the one or more successive extended instruction words is output to the extended data storage unit 600 when a final general instruction word is output to the general instruction word parser 700 by the instruction word selector 400. If a general instruction word does not exist in the buffer of the temporary storage unit 200, but only the extended instruction words exist in the buffer thereof, the extended data (ED) produced by the one or more successive extended instruction words is output to the extended data storage unit 600 when an instruction word which does not perform any operation is output to the general instruction word parser 700 by the instruction word selector 400.

The extended data (ED) output from the extended data parser 500 can be data obtained by summing the operands OPER1-OPERn of the one or more successive extended instruction words or by shifting the operands OPER1-OPERn of the one or more successive extended instruction words to the right side.

The operation of the extended instruction word folding apparatus according to the present invention having the above configuration will be described in detail as follows.

FIG. 2 is a block diagram showing an extended instruction word folding apparatus according to the present invention.

For example, it is assumed that the instruction word storage unit 100 stores instruction words for executing a first general instruction word, a first extended instruction word, a second extended instruction word, a third extended instruction word, a second general instruction word and a third general instruction word, the temporary storage unit 200 includes a first buffer BU1 and a second buffer BU2 which pre-fetch two instruction words stored in the instruction word storage unit 100 to the first and second buffers BU1 and BU2. Then, the operation timing of FIG. 2 will be described with reference to FIG. 3.

Figure 3:
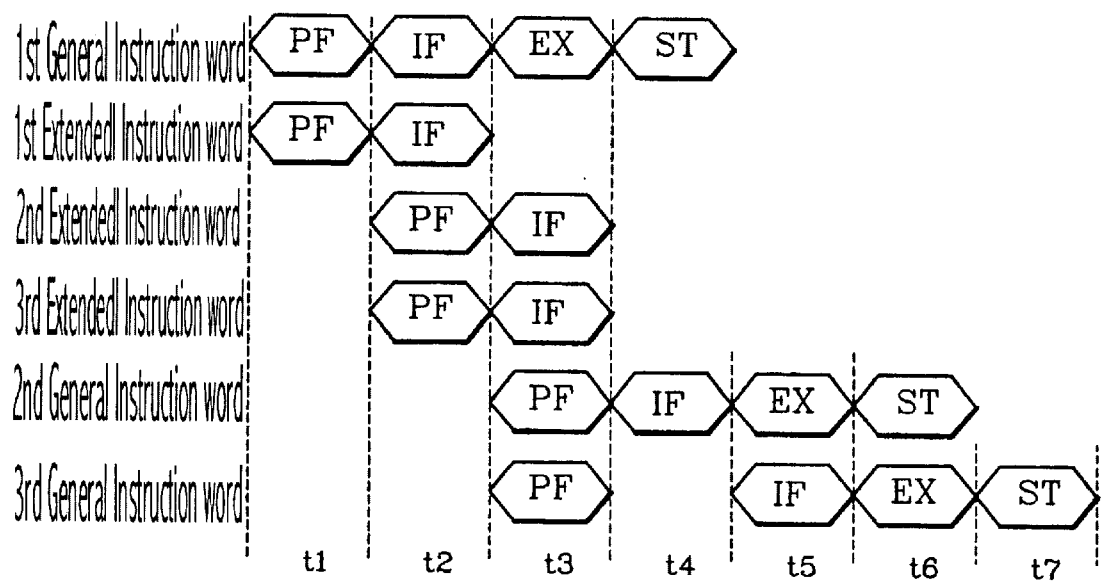
FIG. 3 is a timing diagram of the operation of the extended instruction word folding apparatus of FIG. 2.

FIG. 3 is a timing diagram of the operation of the extended instruction word folding apparatus of FIG. 2.

First, a first general instruction word and a first extended instruction word which are two instruction words stored in the instruction word storage unit 100 are pre-fetched at time t1. The first general instruction word is stored in the first buffer BU1 of the temporary storage unit 200 and the first extended instruction word is stored in the second buffer BU2 of the temporary storage unit 200. The extended instruction word search unit 310 receives the first general instruction word and the first extended instruction word which are output from the instruction word storage unit 100 when the first general instruction word and the first extended instruction word are pre-fetched from the instruction word storage unit 100 to the temporary storage unit 200 at time t1 and outputs a flag signal FLAG indicating whether each instruction word stored in the first and second buffers BU1 and BU2 of the temporary storage unit 200 is a general instruction word or an extended instruction word. Here, since the instruction word output from the instruction word storage unit 100 is a first general instruction word or a first extended instruction word, the extended instruction word search unit 310 outputs a low logic value of an inactivated flag signal (FLAG) and a high logic value of an activated flag signal (FLAG). These flag signals (FLAG) are stored in the flag register 320 and indicate what kind of each instruction word is stored in the current buffers BU1 and BU2. In this embodiment, since the first general instruction word is stored in the first buffer BU1 and the first extended instruction word is stored in the second buffer BU2, a low logic value of '0' is stored in the first flag bit FB1 of the flag register 320 and a high logic value of '1' is stored in the second flag bit FB2 of the flag register 320. The extended decoder 330 outputs a position signal (POS) indicating that the first general instruction word is positioned in the first buffer BU1 and the first extended instruction word is positioned in the second buffer BU2, with reference to the values of the first flag bit FB1 and the second flag bit FB2 of the flag register 320.

At time t2, the instruction word selector 400 outputs the first general instruction word stored in the first buffer BU1 to the general instruction word parser 700, according to the position signal (POS) output from the extended decoder 330. That is, at time t2, the general instruction word parser 700 performs a fetching and decoding operation (IF) of the first general instruction word. At the same time when the first general instruction word is fetched and decoded as shown as IF in FIG. 3, the operand OPER of the first extended instruction word stored in the second buffer BU2 is output to the extended data parser 500 according to the position signal (POS). That is, the extended data parser 500 fetches the first extended instruction word as shown as IF in FIG. 3. The extended data parser 500 operates and processes the operand OPER of the first extended instruction word and outputs the extended data (ED). Since the first extended instruction word is the first extended instruction word following the general instruction word, the extended data parser 500 inputs the operand OPER of the first extended instruction word to the lower bits of the extended data (ED), and inputs the same value as that of the most significant bit of the operand OPER of the input first extended instruction word, to the upper bits higher than the number of bits of the operand OPER of the first extended instruction word, to thereby produce the extended data (ED). The extended data storage unit 600 stores the extended data (ED) output from the extended data parser 500, and outputs the stored extended data (ED) if the extended data (ED) is required by the general instruction word using the extended data (ED). If the first extended instruction word is an extended instruction word successive with the extended instruction word received before the instruction words stored in the buffers BU1 and BU2 of the temporary storage unit 200, that is, in the case that the previously received extended instruction word and currently received first extended instruction word are operated and processed to update the extended data (ED), the previously produced extended data (ED) is shifted to the upper place by the number of bits of the operand of the first extended instruction word, and then the empty lower bits are filled with the operand of the first extended instruction word.

At time t3, the execution unit executes a corresponding first general instruction word according to a plurality of control signals due to the first general instruction word output from the instruction word parser 700, as shown as EX in FIG. 3. At time t4, the resulting signals depending upon the execution of the first general instruction word are stored in a particular register of a memory or a central processing unit as shown as ST in FIG. 3.

In the same manner as the above procedures, the second and third extended instruction words stored in the instruction word storage unit 100 are pre-fetched to the first and second buffers BU1 and BU2 of the temporary storage unit 200 as shown as PF in FIG. 3, at time t2 at which the first general instruction word and the first extended instruction word are fetched and decoded as shown as IF in FIG. 3. At the same time, the extended instruction word search unit 310 investigates the pre-fetched (PF) instruction word and outputs a flag signal (FLAG) indicating whether each instruction word is an extended instruction word or a general instruction word. The flag register 320 stores the flag signal (FLAG) output from the extended instruction word search unit 310 and outputs the stored flag signal (FLAG) to the extended decoder 330. The extended decoder 330 outputs a position signal (POS) indicating that only extended instruction words exist in each buffer BU1 or BU2 of the temporary storage unit 200 at present according to the flag signal (FLAG). At time t3, the instruction word selector 400 determines that no general instruction words do not exist in the temporary storage unit 200 according to the position signal (POS) and the outputs an instruction word for performing no operation, that is, a NOP (No Operation) instruction word to the general instruction word parser 700. The extended data parser 500 receives the operands OPERs of the second and third extended instruction words stored in the temporary storage unit 200, operates and processes the received operands and produces the extended data (ED), according to the position signal (POS). Since the second and third extended instruction words are the extended instruction words successive with the first extended instruction word which has been already operated and processed, the extended data (ED) produced by the first extended instruction word is shifted to the upper bit and the operands of the second and third extended instruction words are input to the empty places of the lower bits in sequence. Here, the number of shifted bits is same as the sum of the bit number of the operands OPERs of the second and third extended instruction words. The extended data storage unit 600 stores the extended data (ED) produced by the first extended instruction word, the second extended instruction word and the third extended instruction word output from the extended data parser 500. Thus, at time t3, the second and third extended instruction words are fetched and decoded as shown as IF in FIG. 3.

Likewise, the second and third general instruction words stored in the instruction word storage unit 100 are pre-fetched to the first and second buffers BU1 and BU2 of the temporary storage unit 200 as shown as PF in FIG. 3, at time t3. The extended instruction word search unit 310 outputs a flag signal (FLAG) indicating whether each pre-fetched instruction word is a general instruction word. The flag register 320 stores the flag signal (FLAG) output from the extended instruction word search unit 310 and outputs the stored flag signal (FLAG) to the extended decoder 330. The extended decoder 330 outputs a position signal (POS) indicating that only general instruction words exist in the temporary storage unit 200 and no extended instruction words exist in the temporary storage unit 200. The instruction word selector 400 determines that only general instruction words exist in the temporary storage unit 200 according to the position signal (POS) output from the extended decoder 330 and the outputs the second and third general instruction words stored in the first and second buffers BU1 and BU2 to the general instruction word parser 700, in sequence. The extended data parser 500 determines that no extended instruction words exist among the instruction words stored in the temporary storage unit 200, and does not update the extended data (ED), according to the position signal (POS). The following execution (EX) and storage (ST) procedures are same. If the second and third general instruction words are instruction words using the extended data (ED), the extended data (ED) stored in the extended data storage unit 600 in advance is used so that the execution unit executes a corresponding general instruction word.

Thus, as shown in the operational timing diagram of FIG. 3, the extended instruction word folding apparatus according to the present invention requires four pipeline clock signals. Thus, two pipeline clock signals are saved in comparison to the conventional art. Accordingly, the efficiency of both a CPU and a program can be increased.

Figure 4:
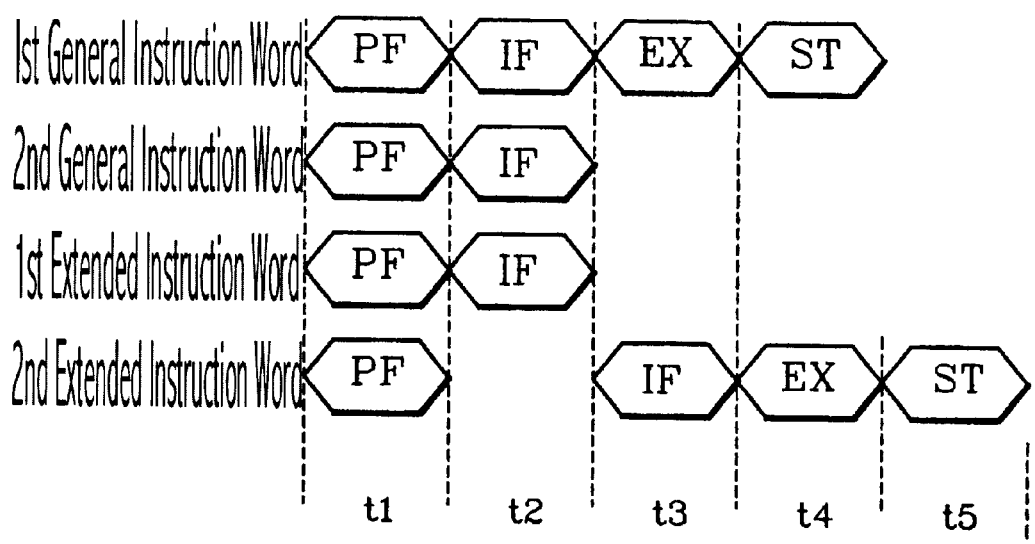
FIG. 4 is another timing diagram of the operation of the extended instruction word folding apparatus of FIG. 2.

FIG. 4 is another timing diagram of the operation of the extended instruction word folding apparatus of FIG. 2.

As shown in FIG. 4, a first general instruction word, a first extended instruction word, a second extended instruction word and a second general instruction word are stored in the instruction word storage unit 100 in sequence. The temporary storage unit 200 is comprised of four buffers BU1–BU4. The flag register 320 is comprised of 4-bit flag bits FB1–FB4. In this embodiment, the operation of the extended instruction word folding apparatus of FIG. 2 will be described as follows.

The first general instruction word, the first extended instruction word, the second extended instruction word and the second general instruction words stored in the instruction word storage unit 100 are pre-fetched to the four buffers BU1–BU2 of the temporary storage unit 200 as shown as PF in FIG. 4, at time t1. The extended instruction word search unit 310 searches the instruction words output from the instruction word storage unit 100, determines which instruction word is a general instruction word or an extended instruction word among the instruction words, and outputs an activated flag signal (FLAG) if the instruction word is an extended instruction word, and outputs an inactivated flag signal (FLAG) if the instruction word is a general instruction word. The flag register 320 stores the flag signals FLAG output from the extended instruction word 310 in the plurality of flag bits FB1–FB4. The flag register 320 has data of '0110' from the least significant bit FB1 to the most significant bit FB4 in this embodiment. The extended decoder 330 determines an activation status of the respective flag bits FB1–FB4 of the flag register 320 and outputs a position signal (POS) indicating that the instruction words stored in each buffer BU1–BU4 of the temporary storage unit 200 is a general instruction word or an extended instruction word. Thus, it can be seen that the extended instruction word or the general instruction word, which belongs to an instruction word, is stored in which buffer of the temporary storage unit 200 by the extended decoder 330.

The instruction word selector 400 selects the first buffer BU1 in which the first general instruction word is stored among the instruction words stored in the respective buffers BU1–BU2 of the temporary storage unit 200 according to the position signal (POS) output from the extended decoder 330 at time t2 and outputs the first general instruction word stored in the first buffer BU1 to the general instruction word parser 700. The general instruction word parser 700 parses the first general instruction word and outputs a plurality of control signals. That is, at time t2, the first general instruction word stored in the temporary storage unit 200 by the instruction word selector 400 and the general instruction word parser 700 are fetched and decoded as shown as IF in FIG. 4. At time t3, the execution unit executes a corresponding first general instruction word according to the plurality of control signals as shown as EX in FIG. 4. At time t4, the resulting signals depending upon the execution of the first general instruction word are stored in a particular register of a memory or a central processing unit as shown as ST in FIG. 4.

At time t2 at which the first general instruction word is fetched and decoded as shown as IF in FIG. 4, the extended data parser 500 receives the respective operands OPER2 and OPER3 of the first and second extended instruction words stored in the second and third buffers BU2 and BU3 according to the position signal (POS), operates and processes the received operands OPER2 and OPER3, and outputs the extended data (ED). When the operands OPER2 and OPER3 are operated and processed to produce the extended data (ED), if the first extended instruction word is the operand OPER2 of the extended instruction word to be executed following the first general instruction word, the operand OPER3 of the second extended instruction word and the operand OPER2 of the first extended instruction word are filled from the least significant bit of the extended data (ED) in sequence, and the bits of the extended data (ED) higher than the most significant bit of the operand OPER2 of the first extended instruction word are filled with the same bit as the most significant bit of the operand OPER2 of the first extended instruction word, to thereby produce the extended data (ED). If the extended instruction word is used in succession with the previous extended instruction word, the extended data (ED) produced in the previous instruction word is shifted to the upper place by the bit number of the operands OPER2 and OPER3 of the first and second extended instruction words and the empty lower bits are filled with the operands OPER2 and OPER3 of the first and second extended instruction words in sequence.

The extended data storage unit 600 receives the extended data (ED) of the extended data parser 500 and stores the same.

In the same manner as the above procedures, the instruction word selector 400 selects the second general instruction word stored in the four buffer BU4 of the temporary storage unit 200 according to the position signal (POS). At time t3, the general instruction word parser 700 performs fetching and decoding of the second general instruction word as shown as IF in FIG. 4. At time t4, the execution unit executes the second instruction word according to the plurality of control signals output from the general instruction word parser 700 as shown as EX in FIG. 4. At time t5, the resulting signals depending upon the execution of the second general instruction word are stored in a particular register of a memory or a central processing unit as shown as ST in FIG. 4.

If the second general instruction word is an instruction word using the extended data (ED), the extended data (ED) stored in the extended data storage unit 600 is used and the execution unit executes a second general instruction word at time t4.

As described above, the extended instruction word folding apparatus according to the present invention processes a following extended instruction word during reading and executing a general instruction word, so that a general instruction word following the extended instruction word can be immediately processed, to thereby enhance performance of the CPU in the extended instruction word system.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. An extended instruction word folding apparatus for use in a central processing unit executing an extended instruction word in order to use data for a value larger than the magnitude of an instruction word or the address of a storage unit, the extended instruction word folding apparatus comprises:

an instruction word storage unit for storing instruction words including a plurality of general instruction words and extended instruction words;

a temporary storage unit including a plurality of buffers for pre-fetching the plurality of instruction words from the instruction word storage unit and storing the pre-fetched instruction words therein;

an instruction word search unit for receiving the plurality of instruction words pre-fetched from the instruction word storage unit to the temporary storage unit, decoding the received instruction words, and outputting a position signal representing the position of a general instruction word and the positions of one or more successive extended instruction words, among the instruction words stored in the temporary storage unit;

an instruction word selector for selecting a buffer in which a general instruction word is stored among the instruction words stored in each buffer of the temporary storage unit, and outputting the general instruction word sequentially, according to the position signal output from the instruction word search unit;

a general instruction word parser for receiving a general instruction word output from the instruction word selector and outputting a plurality of control signals for executing the general instruction word;

an extended data parser for performing an operational processing of operands of one or more successive extended instruction words among the instruction words stored in each buffer of the temporary storage unit, according to the position signal output from the instruction word search unit, and outputting extended data; and an extended data storage unit for storing the extended data received from the extended data parser.

2. The extended instruction word folding apparatus of claim 1, wherein said instruction word search unit comprises:

an extended instruction word search unit for receiving the instruction words pre-fetched from the instruction word storage unit to the temporary storage unit, judging whether each instruction word pre-fetched to the temporary storage unit is a general instruction word or an extended instruction word, and outputting an activated flag signal if the instruction word is determined an extended instruction word;

a flag register including a plurality of flag bits indicating whether each instruction word stored in the plurality of buffers of the temporary storage unit is an extended instruction word or a general instruction word according to the flag signal output from the extended instruction word search unit; and an extended decoder for receiving the plurality of flag bits from the flag registers, determining an activation status of each flag bit, and outputting a position signal representing the positions of the buffer in which the general instruction word is stored and the buffer in which one or more successive extended instruction words are stored among the plurality of buffers in the temporary storage unit.

3. The extended instruction word folding apparatus of claim 1, wherein said extended data parser investigates one or more successive extended instruction words stored in the plurality of buffers of the temporary storage unit in sequence of appearance of the extended instruction words, fills the lower bits of the extended data with the operands of the extended instruction word and fills the extended data of the upper bits higher than the number of bits of the operand of the extended instruction word with the same value as that of the most significant bit of the extended instruction word operand, if the extended instruction word is the first extended instruction word following the general instruction word using the extended data and is not successive with the previous extended instruction words, while if the extended instruction word is an extended instruction word successive with the previous extended instruction word, the previously produced extended data (ED) is shifted to the upper place by the number of the bits of the operand of the extended instruction word and fills the empty lower bits with the operand of the extended instruction word.

4. The extended instruction word folding apparatus of claim 1, wherein said extended data parser investigates one or more successive extended instruction words stored in the plurality of buffers of the temporary storage unit in sequence of appearance of the extended instruction words, and the extended data is shifted to the upper place by the number of the bits of the operand of the extended instruction word and fills the empty lower bits with the operand of the extended instruction word, with respect to the respective extended instruction words.

5. The extended instruction word folding apparatus of claim 1, wherein the extended data of said extended data parser is data obtained by summing the operands of one or more successive extended instruction words.

6. The extended instruction word folding apparatus of claim 1, wherein the extended data of said extended data parser is data obtained by shifting the operands of one or more successive extended instruction words to the right.

7. The extended instruction word folding apparatus of claim 1, wherein said extended data parser receives the position signal output from the instruction word search unit and receives the operand of the extended instruction word stored in the buffer from the buffer in which one or more successive extended instruction words are stored among the instruction words stored in each buffer of the temporary storage unit when the general instruction word is output from the temporary storage unit to the instruction word selector, to thereby operate and process the operand.

8. The extended instruction word folding apparatus of claim 1, wherein said instruction word selector outputs an instruction word for performing no operations if a general instruction word does not exist among the instruction words stored in each buffer of the temporary storage unit, to the general instruction word parser.

9. The extended instruction word folding apparatus of claim 1, wherein said temporary storage unit pre-fetches and updates new instruction words from the instruction word storage unit at the same time when all the instruction words stored in the plurality of buffers are processed by the instruction word selector and the extended data parser.

10. The extended instruction word folding apparatus of claim 1, wherein said extended data parser outputs the extended data to the extended data storage unit when a corresponding general instruction word is output from the instruction word selector to the general instruction word parser if a general instruction word exists in the buffer of the temporary storage unit, while if a general instruction word does not exist in the buffer of the temporary storage unit, the extended data is output to the extended data storage unit when an instruction word for performing no operations is output from the instruction word selector to the general instruction word parser.

* * * * *